United States Patent [19]

Clifford

[11] Patent Number: 4,508,510

[45] Date of Patent: Apr. 2, 1985

[54] METHOD FOR PSYCHOMOTOR TRAINING OF PHYSICAL SKILLS

[76] Inventor: Mona Clifford, 2186 A1A 2B, Indian Harbour Beach, Fla. 32937

[21] Appl. No.: 559,049

[22] Filed: Dec. 7, 1983

[51] Int. Cl.³ .............................................. A63B 69/00
[52] U.S. Cl. .................................................... 434/247
[58] Field of Search ................................ 434/247–258

[56] References Cited

U.S. PATENT DOCUMENTS

| | | | |
|---|---|---|---|
| 3,016,812 | 1/1962 | Chatlain | 434/249 X |
| 3,408,750 | 11/1968 | McCollough | 434/252 |
| 4,015,344 | 4/1977 | Michaels | 434/257 |
| 4,337,049 | 6/1982 | Connelly | 434/247 |

FOREIGN PATENT DOCUMENTS 7522 of 1913 United Kingdom ................ 434/247

*Primary Examiner*—Harland S. Skogquist

*Attorney, Agent, or Firm*—Antonelli, Terry & Wands

[57] ABSTRACT

A technique for training a subject to successfully perform a physical task and thereby acquire a skill in the performance of that task involves analyzing the action characteristics of the subject and, from that analysis, establishing an optimal sequence of movements to be carried out by the subject that are associated with particular patterning of the subject's body parts. In particular, a movement analyst observes the movement of a subject to identify that subject's particular actioning modality and, from that identification, develops an action form sequence that is appropriate for the subject's psychomotor process. Once the body part for initiating a movement within the action form sequence has been identified, it is coordinated with the effective psychomotor function, so that by training a subject with respect to his/her aligning, contouring or balancing sensibilities, the subject will be able to develop optimal action form sequencing.

16 Claims, 13 Drawing Figures

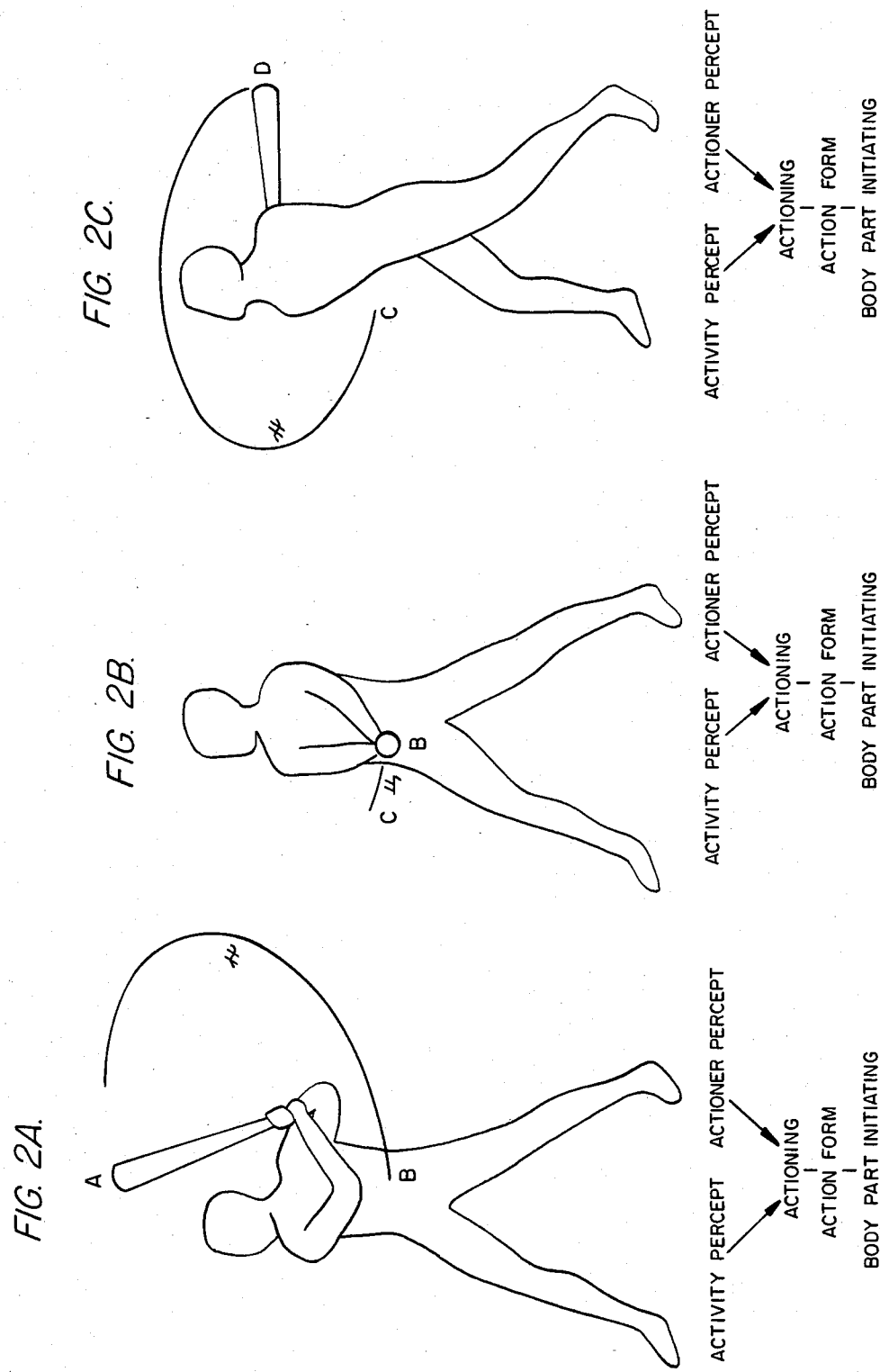

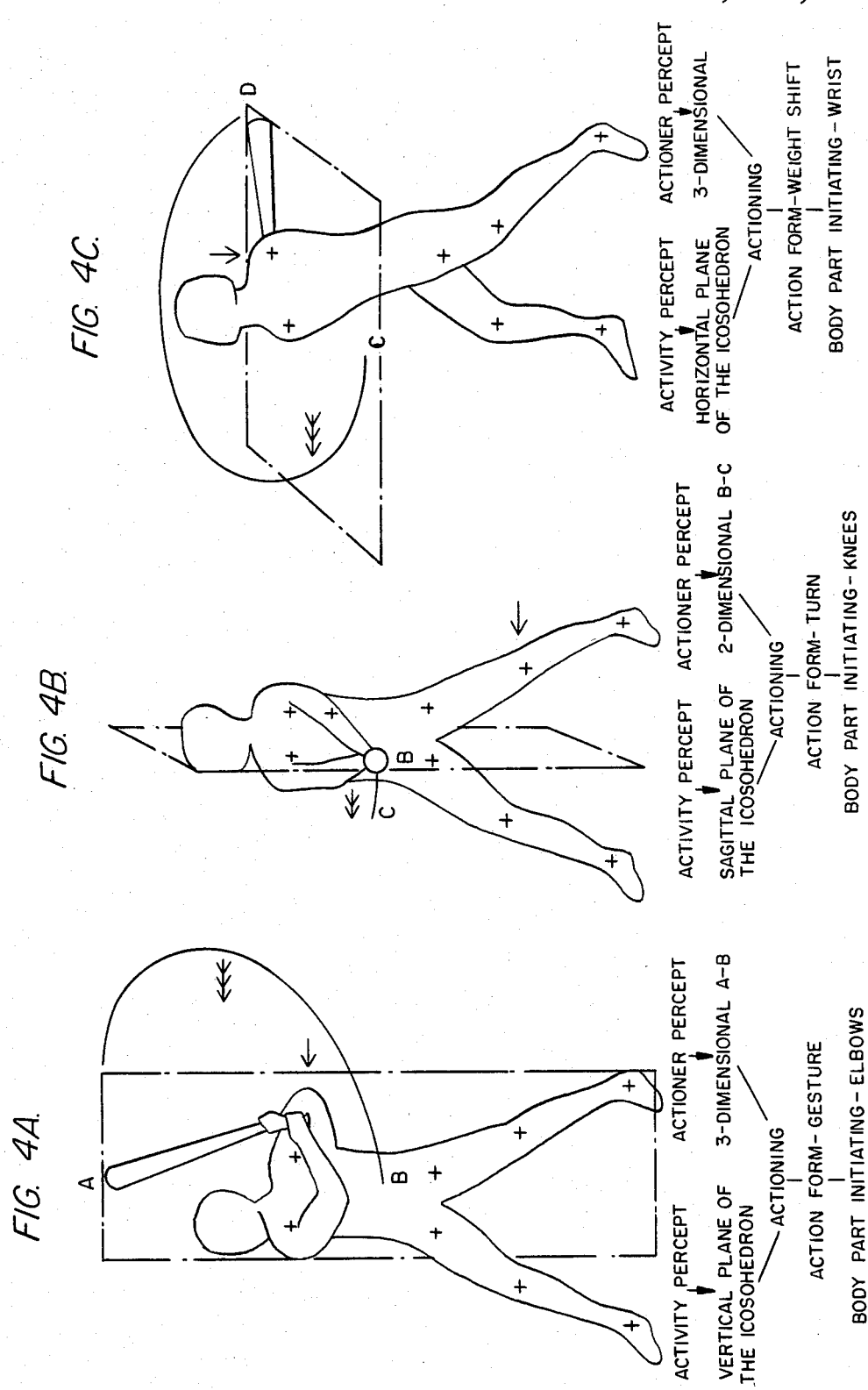

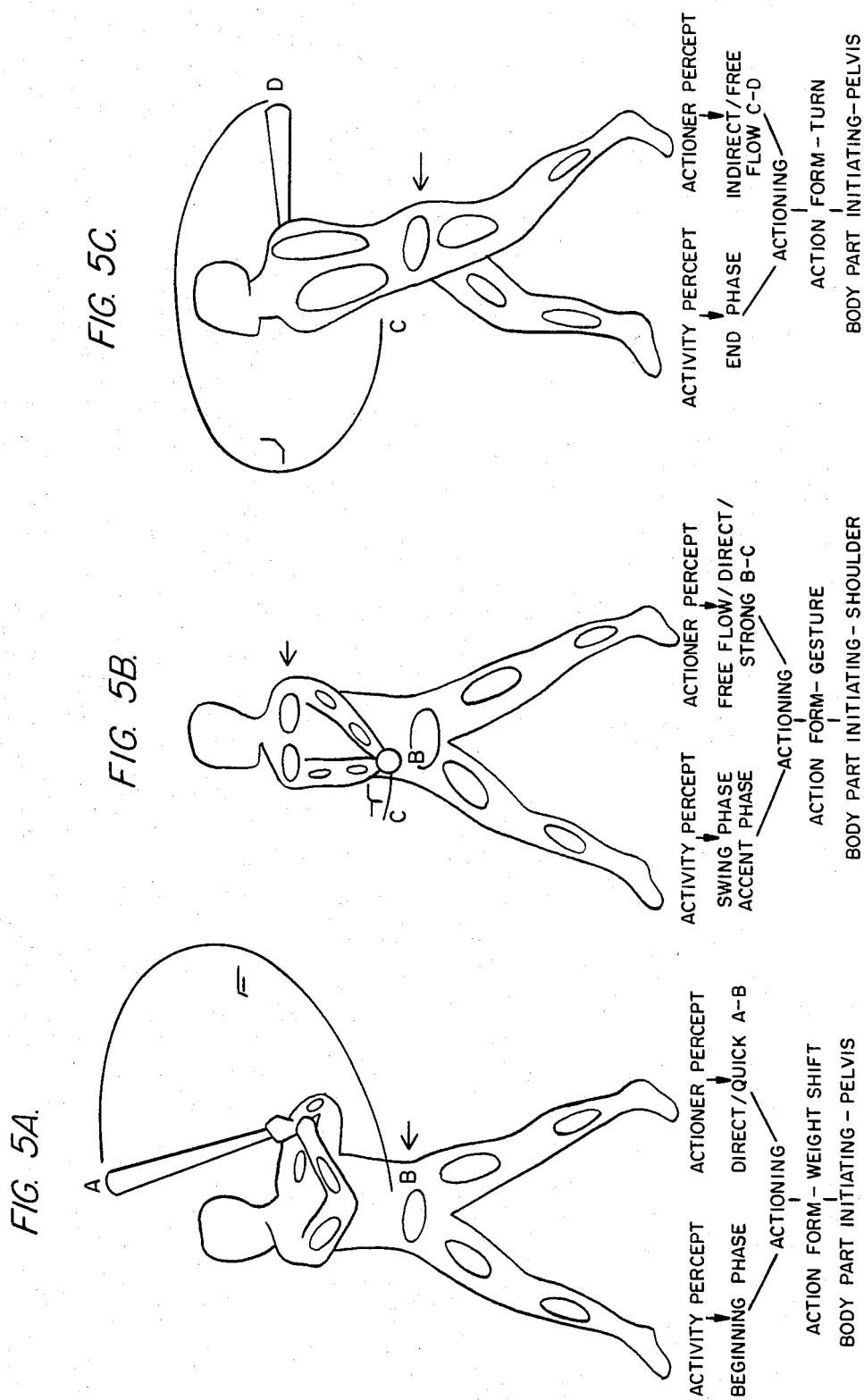

METHOD FOR PSYCHOMOTOR TRAINING OF PHYSICAL SKILLS

FIELD OF THE INVENTION

The present invention relates in general to the field of physical, especially movement, education and is particularly directed to a scheme for training a person to perform a physical skill in accordance with the particular patterning of the person's body parts.

BACKGROUND OF THE INVENTION

Physical skills, such as sports activities, physical therapy, dance, etc. involve a coordinated sequence of some or all of the body parts in a successive or simultaneous arrangement or patterning of these parts for the purpose of achieving a desired result. Conventionally, techniques for training a subject to perform a physical task successfully, so that the person becomes proficient or acquires a skill in the performance of that task, have required the subject to learn from another person's body motion sequence through which the desired end result is successfully obtained. During this process each performance variable is evaluated according to a specific skill representation of a particular physical task. In this manner skill acquisition in performing a physical task is the result of the subject successfully applying previous conditioning, namely, through an accumulation of automated response representations of a successful physical task. Because this type of training limits the subject to only an automated response it does not represent an effective method of physical skill acquisition.

SUMMARY OF THE INVENTION

In accordance with the present invention there is provided a technique for training a subject to successfully perform a physical task and thereby acquire a skill in the performance of that task by analyzing the action characteristics of the subject and, from that analysis, establishing an optimal sequence of movements to be carried out by the subject that are associated with the particular patterning of the subject's body parts.

In particular, the present invention provides a method through which a movement analyst may identify a subject's particular actioning modality and, from that identification, develop an action form sequence that is appropriate for the subject's psychomotor process. Once the body part for initiating a movement within the action form sequence has been identified, it is coordinated with the effective psychomotor function, so that by training a subject with respect to his/her aligning, contouring or balancing sensibilities, the subject will be able to develop optimal action form sequencing. Unlike conventional physical training techniques through which the subject learns a particular motion at each step of the task, the action form sequencing technique of the present invention trains a subject to perceive the action elements as they occur on a moment-by-moment basis and to select the action element that is uniquely appropriate in a specific physical task situation.

Because the movement training technique of the present invention identifies a subject's most effective psychomotor function for a particular application, the present invention is not an automated response approach, as are conventional training methods, but is a sensibilities training technique that relates directly to the psychomotor process through an "action language". As will be described in detail below, action language is a form of communication which describes the movement process through the continuum or perception of action. Its action factors effectively define the elements of the psychomotor process. As a result, physical skill training is acquired through an application of actioning logic which demonstrate the principles of psychomotor coordination.

BRIEF DESCRIPTION OF THE DRAWINGS

FIGS. 2A–2C show successive arrangements of a batter's body parts during the continuum of a baseball bat swing;

DETAILED DESCRIPTION

Figure 1:
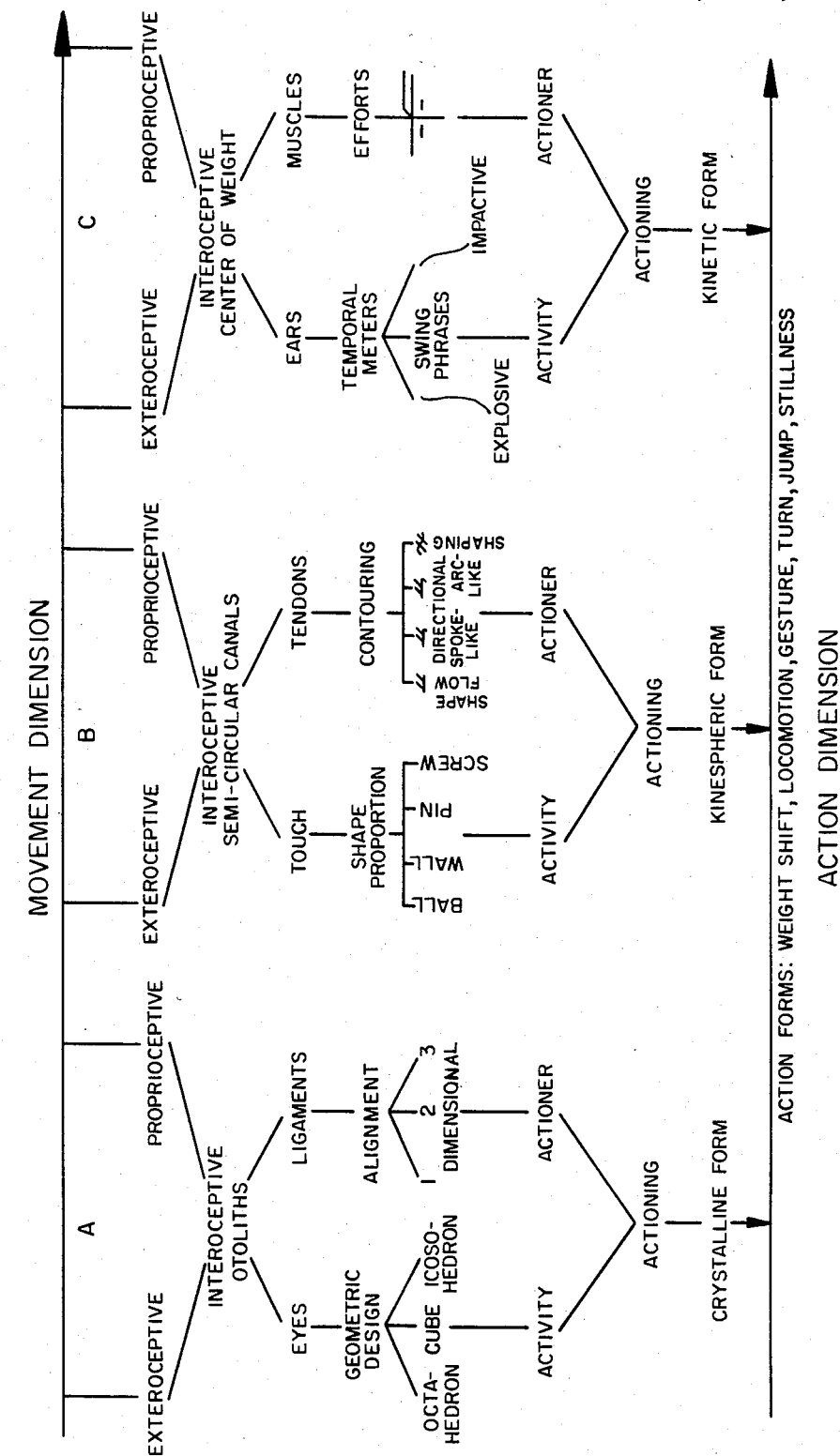
FIG. 1 is a chart showing the component forms of action modalities.

Because the movement training technique of the present invention involves a totally new approach to skill acquisition and relies on an integration of discernible dynamic psychomotor characteristics of a person not heretofore appreciated, it will be useful to describe some fundamental precepts through an understanding of which one skilled in the art, such as an effort/shape movement analyst, may be better equipped to practice the invention.

In the course of human development, man has learned to perceive through the commonly established five senses of taste, smell, touch, sight and hearing. For the purpose of conveying specific information, man has developed a communication technique, commonly called verbal language, whose primary modality is the sense of sound.

Now, within the body there also exists the sense of kinesthesia that conveys information relating to body position and respective muscular tensions of body parts. These are perceived through the receptors of the nerves in the ligaments, tendons and muscles.

While there has been some research into the motor development of humans, most of the encoded process for documented communication research has dealt with the acquistion of verbal language. Each of the processes of verbal language development and, to a limited degree, motor development has only been depicted in a respective stage of its growth significance.

Considering language to be the transmission of information, language consists of essentially two ingredients,—its medium, the vehicle for conveyance, and—the established meaning of its units in this medium. Language which is verbal employs sound as the medium and particularly articulated sound elements as its units. An additional type of language, termed action language, employs movement. Verbal language abstracts and encodes with "sound" percepts, while action language abstracts and encodes using "movement" percepts. These percepts give each language its structure and internal code for semantic function. Verbal language converts sound percepts into words (an individual semantic unit) through the arranging function of syntax. Action language converts movement percepts into action forms (an individual semantic unit) through the rhythmic structure of phrasing. Word units produce the structural syntax for developing meaningful sentences, while action form units (to be described below) produce the structural phrasing for developing meaningful sequences of movement.

Syntax and sequencing formulations may be considered to function on two distinct levels, a surface level and a deep level. The surface level gives language form to sound and movement, while the deep level gives meaning to the language. Since both sound and movement are linear (through the dimension of time), one may assume that the surface level of syntax and sequencing is also linear, since sound and movement occur in a prescribed successive ordering. However, meaning does not occur as a linear event. One understands a sentence (verbal language) or sequence (action language) through the process of converting its elements into units or meaningful relationships. In verbal language, the word semantic units in a sentence function either in a subject context or a predicate context, to define the relationships of the semantic units. In action language, the action form semantic units in a sequence function also in similar relationships. The activity, as subject, determines the form construct of a movement event, and the actioner, as predicate, determines the mover's kinesthetic rhythms. The subject/predicate, activity/actioner relationships in the respective forms of verbal and action language function on a deep level. Hence, syntax and sequencing are integral structures that interact on two distinct (surface and deep) levels, to provide the necessary surface ordering scheme as well as the semantic means for interpreting a meaningful message.

Man uses his inherent abstracting capacities to process information through the constant dialogue of data received through his senses. He selects those qualities and particulars that are logically-perceptible and form-discernable. Identifiable patterns are conceived as configurations and represented through the symbols transformed into concepts. Each sensor medium has its own form of object representation. However, only movement and sound have symbolic references of a denotive function. Words are used to define objects, action forms determine movement behavior. Through the constructs of both the sentence and sequence, denotive relationships are established as an essential language function. They shape a conception, an abstracted form which is both perceptually conceivable, as well as conceptually communicable.

As the present invention is particularly directed to a movement training technique which employs action language, it is useful to consider a person's movement experience through its action continuum, articulated through an easily identifiable movement behavior called an action form. There are six categories of action forms. Like words in a sentence, action forms are the structural components of every movement event. Specifically, they are 1—weight shift, the transfer of a weight bearing body part(s) to another weight bearing body part(s); 2—locomotion, the transfer of the entire body from one place to another; 3—gesture, the movement of any non-supporting body part(s); 4—jump, a movement where the total body is suspended and unsupported; 5—turn, a movement that changes direction; and 6—stillness, a pause between movements. Each of these movement events has its own very specialized, as well as individualized, characteristic configuration of these action forms.

As an illustration, consider the movement process of a person sitting at rest who gets up to answer a door bell. The person is initially sitting, and in response to the door bell rises (weight shift). The individual then turns (turn) to face the direction of the door and walks (locomotion) to the door. The person then grasps the door knob and opens the door (gesture). Once the door is open, there is a moment of hesitation (stillness) to recognize the visitor. The person then steps forward to greet the visitor (weight shift) and shakes hands (gesture).

As another illustration, consider the movement process of a player in a basketball game. Upon receiving the ball, the player takes a step (weight shift), adjusts his direction (turn) and dribbles towards the basket (locomotion). The player than positions himself in a better position (gesture) to shoot (jump) and shoots the ball at the basket (gesture). The player watches the shot (stillness) and, as it misses, he steps towards the ball (weight shift). The player catches the ball and then tries another shot (gesture and jump).

Obviously, the foregoing examples are very simplified illustrations of action form sequencing, yet, in terms of actions forms, each shares a similar sequencing pattern, although the function and intent of each application is considerably different. Through the establishment of the above six action forms, discerning the basic behaviors of a movement event is greatly facilitated. Action forms have a mediating function, as they become both the definition and the means of perceiving the action continuum.

The action language described herein is a language for movement; it identifies and determines the elements of the psychomotor process. Since the psychomotor process is a product of movement perception, in order to appreciate the intrinsic logic of action language, it is first necessary to understand the process of movement perception.

Man receives his movement related information through three sensory systems of the body (1)—the exteroceptive, (2)—proprioceptive and (3)—the interoceptive. Through the eyes, touch and ears, man apprehends an exteroceptive spectrum of visual, tactile, and aural information. The proprioceptive sensory receptors of the ligaments, tendons and muscles convey kinesthetic information about alignment and contour of the joints as well as balance from the tonus response of the muscles. Finally, the otoliths and semicircular canals of the inner ear and the center of weight perform interoceptive functions, translating the sensory information of both the exteroceptive and proprioceptive receptors into the action elements of movement.

In accordance with my invention, I have established a movement training technique through which every person, regardless of that person's skill in performing a physical task, may be classified into one of three prescribed categories of movement (termed action modalities), in which the above-enumerated sensory systems evoke different responses, and, as a result, require respectively different patterning of the person's body parts in performing a prescribed task of interest. These action modalities, described in detail below and outline-tabulated in FIG. 1, relate to the manner in which a person patterns his/her body parts during the course of his/her moving and are identified as I-crystalline, II-kinespheric and III-kinetic.

The crystalline form of action modality shown in part A of FIG. 1, is characterized by the fact that in the course of the subject's movement, the subject's body parts' patterning establishes identifiable geometric designs. Visual information (exteroceptive) depicts the activity percept that patterns geometric design describing planes, the octahedron, cube or icosohedron. Ligament information (proprioceptive) conveys the actioner percept that describes one, two or three dimensional trace form configurations. Interoceptive information, obtained by the otoliths, conveys the position of the head in relation to the horizontal plane, coordinating the exteroceptive visual information of the eyes with proprioceptive alignment information of the ligaments to gestalt action elements of the crystalline form.

The kinespheric form, shown in part B of FIG. 1, is characterized by the contouring of movement. Unlike the crystalline form in which exteroceptive information is derived through the sense of sight and conveys a geometric design, here, the exteroceptive sense involves the sense of touch (tactile), depicting the activity percept that proportions ball, wall, pin or screw shapes. Proprioceptive sensory information in the kinespheric form is derived from the nerves in the tendons and denotes body contouring. Here, the tendons convey the actioner percept that contour shape flow, spoke-like-directional, arc-like-directional and shaping. Finally, interoceptive information obtained from the semicircular canals conveys the sense of direction (inclination) in three dimensional space and coordinates the proprioceptive contouring information of the tendons with the exteroceptive tactile information of touch to gestalt action of the kinespheric form.

The third action language form, shown at part C of the chart of FIG. 1, is the kinetic form. Interoceptive information concerning balance is conveyed from the center of weight. This coordinates aural exteroceptive information with the proprioceptive effort tonus information of the muscles into gestalt action elements characteristic of the kinetic form. The tonus interplay is a balancing coordination and is discerned through the activity percept which patterns temporal phrasing. Accordingly, the subject perceives the body part patterning of a moving individual through the phases of exertion/recuperation phrasing of effort's tonus. The appropriate temporal phrase is selected from dynamics that are described according to the phase placement of the accent. When placed at the beginning effort phase, it is called an explosive phrase; at the middle phase, a swing phrase; and, at the end phase, and impacted phrase. In order to perform body part patterning of the kinetic form's activity percept, the subject's tonus sensibilities of the kinetic form's actioner percept are developed through a sensibilities training which depicts tonus configuration of eight effort elements. The psychomotor function which is coordinated through the kinetic form phrases body part patterning that communicates non-verbal behavior attitudes.

Because perception is both selective and individual, a person's movement encoding and response determine that person's own unique movement behavior. Even though a specific application (dance, sport, etc.) will define a particular action form sequence, the highly individualistic coordination of the activity/actioner will determine slight, but significant, variations in the ordering of an individual action form sequence. In order to identify the most appropriate action form sequence for an individual in a specific skill application, a person's particular actioning modality must first be established.

By observing the stature and movement of the subject, a movement analyst can allocate the subject's modality into one of the above described crystalline, kinespheric and kinetic forms. The individual's actioning modality is then compared with the actioning modality of the particular application under consideration. When the modality of the individual is identified, the modality of a specific skill for that particular form is coordinated with the form of interest so that the action form sequence which designs the appropriate body part patterning can be established.

In learning to apprehend the crystalline form of actioning, the movement analyst must first distinguish the alignment orientation of the otoliths' interoceptive function.

This basic axial relationship of the vertical to the horizontal is demonstrated in the dimensional cross concept, which describes the orientation of the body (in space) with three axes-vertical (up-down), horizontal (side-side) and sagital (forward-backward). Then, through movements which describe and differentiate between the actioner's percept of one, two or three dimensional trace form patterning, the movement analyst can develop the specific proprioceptive sensibilities for apprehending his/her own ligament alignment function. The actioner's dimensional percept describes the ligament's axial patterns which the mover employs to align his/her trace form paths as follows: 1—a one-dimensional movement designs a path of alignment which traces along the axis of the initiating joint; 2—a two-dimensional movment designs a path of alignment that traces around the axis of the initiating joint; and 3—a three-dimensional movement designs a path of alignment which traces along and around the axis of the initiating joint.

Kinesthetic empathy enables the movement analyst to discern the particular action or percept patterning of another person's ligament alignment function.

In order to enable the movement analyst to discern the activity percept of the crystalline form, it is necessary for the movement analyst to perform visual perceptional training exercises which demonstrate the geometric designs of a mover's encircling space. The geometric models of the activity percept for the crystalline form are as follows: 1—the octahedron, a form that connotes the extreme reaches of the dimensional cross; 2—the three planes, forms which will occur when the dimensional cross is extended into geometric patterns that describe—(a) vertical plane, trace form paths that trace an up/down and side/side pattern, (b) a horizontal plane, trace form paths that trace a side-side and forward-backward pattern, and (c)—a sagital plane, trace form paths that trace a forward-backward up-down pattern; 3—the six-sided geometric model of the cube designs a form that extends the dimensions of three planes into the extreme reaches of the right directions or diagonals; and 4—the icosohedron, a form where the corners of the three planes are connected, designs a twelve sided crystalline form.

By coordinating the one, two or three dimensional patterning of the actioner dimensional percept with the geometric design of the activity percept, a movement analyst is able to determine the appropriate alignment pattern action form sequence for a subject whose actioner modality is oriented in a crystalline form.

A similar training procedure is used for the kinespheric and kinetic forms. In learning to distinguish the kinespheric form, the effort/shape movement analyst must first apprehend the contouring orientation of the semi-circular canals' introceptive function, prescribing how a subject shapes to his/her surrounding space. Movements which describe and differentiate between the actioner percept of shape flow, spoke-like directional, arc-like directional and shaping will develop the special proprioceptive sensibility for apprehending the movement analyst's own tendon contouring function. The actioner's shaping percept describes the tendon tensile pattern which a subject employs to contour his/her surrounding space as follows: 1—a shaped flow movement describes a passive use of a mover's tendon's tensile functioning, so that the trace form paths are indistinct and do not contour shapes; 2—spoke-like directional movement contours a linear path in space through the tendons' tensile function of sliding together (two equal forces in opposite directions operating on adjacent parts); 3—arc-like directional movement contours a flat curve linear path in space through the tendon's tensile function of bending (a single force directed against one part); and 4—shaping movement contours a sculptural path in space through the tendons' tensile function of torsion, a twisting pattern of forces around a joint.

Through kinesthetic empathy, the movement analyst is able to discern the particular actioner percept patterning of another person's tendons' contouring function.

In order to equip the movement analyst with the ability to discern the activity percept of the kinespheric form, perceptual training exercises which determine the shape proportioning of a mover's surrounding space are performed. The shaped models of the activity percept are as follows: 1—pin, a shape contouring a narrow elongated proportion; 2—ball—a shape contouring a rounded proportion; 3—wall, a broad flat shape; 4—screw—a spiral, twisted shape.

By collaborating the shape flow, arc-like directional, spoke-like directional and the shaping movements of the actioner shaping percept, the movement analyst is able to determine the appropriate contouring pattern and action form sequence for a subject whose actioning modality is oriented in the kinespheric form.

For apprehending the kinetic form, the movement analyst must train his/her interoceptive sensibilities to discern the balancing function of the center of gravity. Then, the development of the proprioceptive apprehending of the actioners' percept is acquired through the respective effort elements which the describe the qualities of muscles' tonicities. These exertions or effort elements specifically quantify the qualitative changes in a subject's muscular response. The qualities of muscular response are defined in the effort terms of flow, weight, time and space factors. Flow describes the quality of tension which can be either free or bound. The weight factor discerns either light or strong elements, time either sustained or quick and space in determining quantities of focus demonstrate either direct or indirect elements. To discern the particular actioner percept patterning, the movement analyst must acquire the appropriate empathetic skill for determining the eight effort elements.

The activity percept of the kinetic form is taught through perceptual training exercises that determine explosive, swing, and impactive phrase patternings. When the movement analyst is able to discern the eight effort elements of the actioner percept and coordinates them through the phase balancing with the phrasing patterning of the activity percept, he/she is then able to determine the appropriate action form sequence for a subject whose actioning modality is the kinetic form.

Once the movement analyst has become thoroughly familiar with the three actioning modalities of the crystalline, kinespheric and kinetic forms, he/she then is able to discern the appropriate actioning modality for both a particular subject and a particular physical skill application. The movement analyst coordinates the actioning modalities of both a particular subject and the physical task through an activity/actioner percept collaboration. Using the action elements of the activity percept of the physical task actioning modality, an actioning prototype is designed. The movement analyst then collaborates and coordinates the activity actioning percepts of the subjects actioning modality with the physical task actioning prototype. A particular subject's action form sequence is determined according to the action intent of the body part initiating change as characteristic of that subject's actioning modality. If a subject is orientated in the crystalline form, then that action form sequence is ordered according to what body part is taking a new direction. In a kinespheric form, the body part that contours a new shape defines the action form sequence. Finally, a body part that introduces a new effort tonus will order the action form sequence according to the kinetic form.

As described previously, one of the significant features of the present invention is the fact that a skill is acquired not through an automated response process but by identifying to which of the three movement forms (action modalities) the subject belongs. As explained in detail above, depending upon how an individual receives sensory information through his exteroceptive, proprioceptive and interoceptive sensory systems, that individual will fit into one of the three forms defined, namely crystalline, kinespheric and kinetic. A person who is a kinetic form individual should not be trained to perform a task that identifies with the crystalline or kinespheric forms. However, as was described above, conventional approaches of using automated response training often creates this very situation. Simply on a statistical basis, using a conventional approach there is a two out of three chance that a person will be taught to perform a physical task by a person whose kinesthetic form is different from the person being taught, thereby making it difficult for the person to successfully complete the task, much less acquire skill in that task.

According to the present invention, since every individual, in the course of his/her movements, conveys (through action language) information that classifies the actioning modality of that individual as one of a crystalline form, kinespheric form or kinetic form, then it is merely a task for the movement analyst to make that identification and to establish the sequence of body part movements for accomplishing a particular task. Note here that the emphasis is on the sequence of the movements, not in the movements themselves. An individual whose movement characteristics place him in the kinetic form category does not perform different movements from a person in one of the other categories, but rather is required to carry out those movements using an action form sequence different from an individual falling into one of the other categories (crystalline or kinespheric).

In order to provide a practical illustration of the manner in which the present invention is employed to prescribe to the correct (and most efficient) sequence of movements of a subject's body parts in performing a physical task, consider the example of a baseball player at bat. The task here to be performed is to swing the bat from a position of readiness, hit a pitched ball and then follow through in the course of the swing. This is illustrated in general in FIGS. 2A-2C which show respective successive arrangements of the batter's body parts in the course of a continuum of movement from the start of the swing through the end of the follow through.

As it turns out, sports, in general, of which swinging a baseball bat may be considered a particular type, involve movement skills that are most readily classified into the kinespheric form of actioning modality. This does not mean that all athletic applications necessarily have a kinespheric form of actioning modality, but simply, on a statical basis, these forms of movement are often most easily or readily identified as prescribing successive shapes and thereby classifiable into the kinespheric form of actioning modality.

In carrying out the present invention, the movement analyst observes the physical activity being accomplished and, in particular, notes those instances during the continuum of movement in the course of performing the physical task where readily identifiable aspects of the modality being employed are demonstrated. For the example under consideration, and using the kinespheric form of modality as the actioning prototype, the batter prescribes three specific activity percepts of the kinespheric form. The first of these occurs at the beginning of the swing, shown in FIG. 2A, in which the body parts prescribe a pin shape. The bat is held in a position that elongates and narrows the body. In the course of the swing, from the position shown in FIG. 2A, where the swing starts, to the point where the bat contacts the ball, the end of the bat is moved around to the front of the body from its original narrow position so that, as an extension of the arms, the overall shape prescribed by the end of the bat and the remainder of the body parts is generally a ball shape as shown in FIG. 2B. Continuing through the swing, the follow through shown in FIG. 2C demonstrates that the body parts create an activity percept of a twist shape. Having identified these three successive activity percepts, the next task of the present invention is to establish those action forms and associated action-initiating body parts which will most efficiently enable the body to sequentially advance from one activity/actioner percept to another through the continuum of action of the task at hand—the swing of the baseball bat.

I KINESPHERIC MODALITY

Figure 3A:
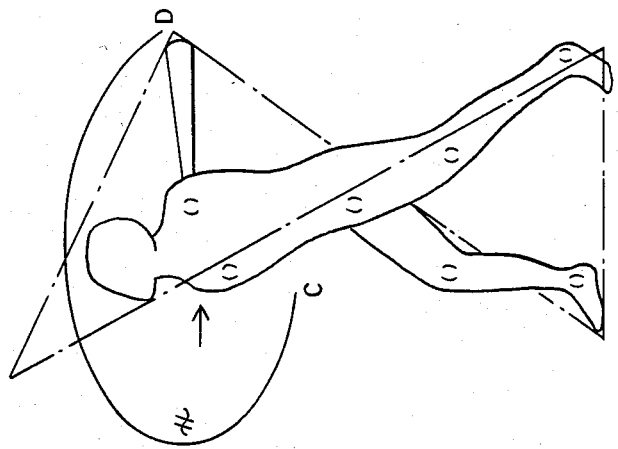
FIGS. 3A–3C; 4A–4C; 5A–5C show examples of sequences for the swinging of a baseball bat for the crystalline, kinespheric and kinetic action modalities, respectively.
Figure 3B:
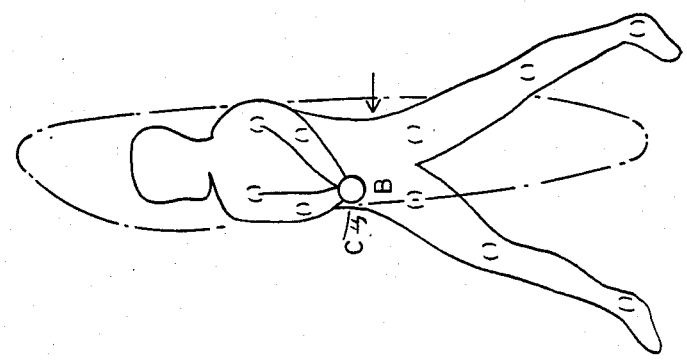
Figure 3C:
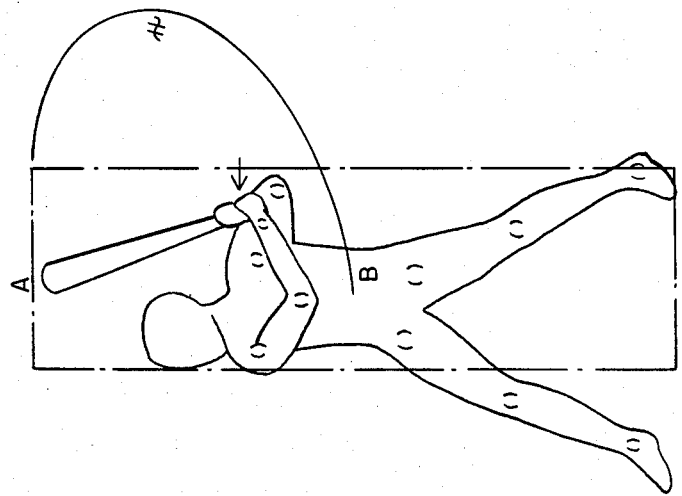

Looking now at FIGS. 3A-3C, which show the above mentioned activity percepts for the kinespheric modality, as the batter is prepared to begin striking the ball his body parts define a pin shape, as the activity percept, as shown in FIG. 3A. The actioner percept to be carried out in order to sequence from the activity percept of a pin (FIG. 3A) to the activity percept of a ball (FIG. 3B) is a contour shaping from the end of the bat at point A to the location B where the ball is to be struck. In order for the body parts to prepare most efficiently, they describe a pin-shape, and peform a gesture action form through a movement initiated by the wrists.

When hitting the ball, B-C as shown in FIG. 3B, the activity percept of the body to the end of the bat is a ball shape. The actioner percept is arc-like directional contour change. A weight shift action form is initiated in the pelvis at this point in the movement sequence, as the ball is struck.

Finally, as shown in C-D in FIG. 3C, completion of the swing involves a twist of the body, with the new change and shaping of the body contour as the actioner percept. The follow-through of the swing is initiated by the shoulder as a body turn action form.

In the above characterization of the swing of the baseball bat using the kinespheric modality as the actioning prototype, three successive instances of body shaping-contouring that are readily identifiable in the continuum of the swing were identified. Using these shapes, body part initiating movements were established that enable the batter to efficiently pattern his body parts to prescribe the next shape in the sequence. For the crystalline and kinetic forms of actioning modality, however, it is not shapes that are of concern, but rather the specific attributes of those modalities. Still, the benefit of the kinespheric form prototype is used to establish the sequencing to be employed. Namely, for the crystalline and kinetic forms, rather than identify body contouring-shapes, the specific attributes of these other forms will be addressed, yet they will be addressed at the same times of occurrence in the continuum of the action.

II CRYSTALLINE MODALITY

FIGS. 4A-4C illustrate the swinging of a baseball bat at a pitched ball for a person whose actioning modality is the crystalline form. In FIG. 4A, the batter's body defines a vertical plane of the icosohedron, side high, as the activity percept. In this stance, at the beginning of the swing, the batter is holding the bat in a vertical position in the course of beginning to swing at the pitch. (It will be recalled from the above explanation of the kinespheric form of actioning modality for this particular task that the activity percept involved a pin-shape. Since it was the beginning of that swing sequence that was readily identifiable, that point of occurrence in the continuum of the motion of the physical task is also employed for the crystalline form and also the kinetic form as will be explained below.) Associated with the activity percept of a vertical plane is the actioner percept which is three-dimensional A-B. Whose associated action form required to sequence to the next activity percept sagittal plane of the icosohedron (FIG. 4B) involves a gesture initiated by the elbows.

Thus, in order to enable the batter to most efficiently initiate an action form sequence that will transform the original activity percept A-B of a vertical plane in FIG. 4A to the sagittal plane in FIG. 4B, the actioner percept at the beginning of the swing requires a gesture in the form of a movement of way of the elbows, arms and hands. Initiating the movement in this manner permits the bat to be efficiently placed in contact with the ball and prescribe the sagittal plane activity percept B-C of FIG. 4B.

In order for the bat to strike the ball, the actioner percept is two-dimensional BC, and the body must carry out a turn (action form) with the knees initiating the action, as shown in FIG. 4B. Then, as the bat has struck the ball and the batter proceeds with the follow through, the movement of the bat causes there to be defined the activity percept C-D of FIG. 4C as a horizontal plane made of the side and middle back as well as the end of the bat at D. The actioner percept is three-dimensional with the wrist initiating the movement of the bat and there being a weight shift action form.

III KINETIC MODALITY

For an individual whose actioning modality is categorized as the kinetic form, the sequence of activity/actioner percepts is shown in FIGS. 5A–5C. As pointed out previously, the kinetic form of actioning is characterized by effort tonus and temporal phrasing. Thus, the effort elements of quickness, strength, free-flow, direct/indirect are characteristics of the swing. At the beginning phrase of the swing (activity percept, FIG. 5A), the actioner percept is a direct/quick movement of the tip of the bat from point A to point B. This phrase describes a weight shift (action form) initiated from the pelvis.

The middle phase initiated by the shoulder is a gesture action form that describes the activity percept B-C of FIG. 5B where the bat contacts the ball. Here the activity percept of a batter'swing is accented, hence determining a swing phrase. To accomplish this phase, the actioner percept required is a free flow/direct/strength in the application of the bat to the ball in the area of contact BC of the bat with the ball.

Continuing through the swing to the follow-through C-D, the action form for this actioner percept is a turn action form initiated by the pelvis as the bat swings through so as to carry the bat into the end phase of the actioner percept shown in FIG. 4C. This demonstrates an indirect/free flow movement of the bat from point C to point D.

As will be appreciated from the foregoing explanation of an example of a batter swinging a baseball bat for each of the three action form modalities-kinespheric form, crystalline form and kinetic form, the sequence for each of the actioning modalities reveals a different order of action forms for the continuum of movement from the beginning of the swing to its completion. For an individual whose actioning modality is kinespheric, the swing begins with a gesture, initiated by the wrist, then a weight shift from the left foot to the right foot initiated by the pelvis, and finally a turn, initiated by the shoulder. For the crystalline form of actioning modality, the batter begins with a gesture initiated by the elbows, followed by a turn of the body initiated by the knees, and finally, completed with a weight shift from the left foot to the right foot initiated by the turning over of the wrists and the swing follow-through. For a kinetic form of actioning modality, the batter begins with a weight shift initiated by the pelvis, followed by a gesture initiated by the shoulder as the bat contacts the ball, and terminating with a turn of the body initiated by the pelvis with a free follow through of the swing of the bat.

The overall task of striking the ball with the bat for each type of actioning modality and the result obtained is the same; however, the sequence of action and the body part initiating that action differs for each individual because of the differences in actioning modality into which the respective individual are classified.

It is to be observed that the foregoing example of the swing of a baseball bat at a pitched ball is not limitative of the application of the invention, but has merely been used to provide a pictorial representation of a sequence of identifiable activity/actioner percepts which occur during the continuum of one type of physical movement task. From the foregoing description it will be appreciated that the present invention is applicable to any type of physical movement to be performed by a subject, and its application to a number of diverse activities including dance, sports and physical recuperative therapy has been successfully demonstrated. In this regard, the present invention is particularly advantageous because it is able to not only equip the subject with the ability to correctly perform this physical task at hand (according to that subject's actioning modality), but to apprehend the sequence of movements necessary for successful completion of the task in a time span considerably abbreviated compared to conventional techniques of teaching the subject to copy an established set of exercises (which may be totally in appropriate for that particular subject). This is especially significant in physical therapy and rehabilitation exercises where a subject whose movement has been constrained for a period of time must require or relearn the use of a limb. In accordance with the present invention that "skill" can be rapidly attained by the subject, since the performance standards of the invention are intimately associated with the individual (through his/her modality) rather than on a general set of procedures that are dictated by the task for all prospective subjects.

While I have shown and described an embodiment in accordance with the present invention, it is understood that the same is not limited thereto but is susceptible of numerous changes and modifications as known to a person skilled in the art, and I therefore do not wish to be limited to the details shown and described herein but intended to cover all such changes and modifications as are obvious to one of ordinary skill in the art.

What is claimed:

1. A method of training a person to perform a physical task comprising the steps of:
    (a) monitoring the patterning of the person's body parts as the person executes movement;
    (b) identifying a prescribed actioning modality with which the person is associated on the basis of the patterning of the person's body parts as monitored in step (a);
    (c) establishing a sequence of action forms to be carried out by said person in the course of performing said task in accordance with the actioning modality of said person as identified in step (b); and
    (d) causing the person to perform said task by executing the component movements thereof in accordance with the sequence of action forms established in step (c).

2. A method according to claim 1, wherein step (d) includes the steps of sensitizing the person to his/her interoceptive, exteroceptive and proprioceptive sensiblities for the actioning modality identified in step (b), whereby the person is caused to execute said sequence of action forms in accordance with his/her actioning modality.

3. A method according to claim 1, wherein step (a) includes the step of observing the patterning of the person's body parts and becoming sensitized to said patterning through kinesthetic empathy.

4. A method according to claim 1, wherein step (b) comprises identifying said actioning modality in accordance with one of the geometric design configured by the person's patterning, the shape/contouring of said patterning and the phrasing/tonus effort of said patterning.

5. A method according to claim 1, wherein said actioning modality is one of the crystalline form, the kinespheric form and the kinetic form.

6. A method according to claim 2, wherein step (a) includes the step of observing the patterning of the person's body parts and becoming sensitized to said patterning through kinesthetic empathy.

7. A method according to claim 6, wherein step (b) comprises identifying said actioning modality in accordance with one of the geometric design configured by the person's patterning, the shape/contouring of said patterning and the phrasing/tonus effort of said patterning.

8. A method according to claim 1, wherein step (c) comprises the steps of
- observing a person's performance of a physical task and identifying a sequence of activity percepts that occur during the continuum of movement in the performance of the task,
- for said sequence of activity percepts, establishing a corresponding sequence of actioner percepts to be carried out by said person,
- establishing said sequence of action forms to be carried out by said person that enable said actioner percepts to be executed in the sequence, and
- identifying, for each action form, the body part of the subject that is to initiate movement that will accomplish said action form.

9. A method of training a person to perform a physical task comprising the steps of:
- (a) monitoring the performance of said physical task and identifying, for a selected actioning modality, a sequence of activity percepts that occur during the continuum of movement in the performance of said task;
- (b) monitoring the patterning of the person's body parts as the person executes movement;
- (c) identifying a prescribed actioning modality with which the person is associated on the basis of the patterning of the person's body parts as monitored in step (b);
- (d) identifying a sequence of activity percepts associated with the actioning modality identified in step (c) that occur in correspondence with the sequence of activity percepts identified in step (a);
- (e) for the sequence of activity percepts identified in step (d) establishing a corresponding sequence of actioner percepts associated therewith;
- (f) establishing a sequence of action forms to be carried out by said person that enable said actioner percepts to be executed; and
- (g) causing said person to execute the component movements of said task by initiating movements through respectively identified body parts that will accomplish said sequence of respective action forms.

10. A method according to claim 9, wherein step (b) includes the step of observing the patterning of the person's body parts and becoming sensitized to said patterning through kinesthetic empathy.

11. A method according to claim 9, wherein step (b) comprises identifying said actioning modality in accordance with one of the geometric design configured by the person's patterning, the shape/contouring of said patterning and the phrasing/tonus effect of said patterning.

12. A method according to claim 9, wherein said selected actioning modality is one of the crystalline form the kinespheric form and the kinetic form.

13. A method of training a person to perform a physical task comprising the steps of:
- (a) monitoring the performance of said physical task and identifying, for a selected actioning modality, a sequence of activity percepts that occur during the continuum of movement in the performance of said task;
- (b) for the sequence of activity percepts identified in step (a), establishing a corresponding sequence of actioner percepts associated therewith;
- (c) establishing a sequence of action forms to be carried out by a person having said selected actioning modality that enable said actioner percepts to be executed so as to generate an actioning prototype for the performance of said task;
- (d) establishing corresponding sets of activity percepts, actioner percepts and action forms, for actioning modalities when then said selected actioning modality based upon the actioning prototype generated through the performance of steps (a)-(c);
- (e) monitoring the patterning of said person's body parts as the person executes movement so as to identify the actioning modality with which said person is associated; and
- (f) causing said person to execute the component movements of said task by initiating movements through respectively identified body parts that will accomplish the sequence of action forms associated with that person actioning modality for said task.

14. A method according to claim 13, wherein step (e) comprises identifying said person's actioning modality in accordance with one of the geometric design configured by the person's patterning, the shape/contouring of said patterning and the phrasing/tonus effort of said patterning.

15. A method according to claim 13, wherein said selected actioning modality of step (a) and each of said actioning modalities of step (d) is one of the crystalline form, the kinespheric form and the kinetic form.

16. A method according to claim 13, wherein step (e) comprises observing the patterning of said person's body parts and becoming sensitized to said patterning through kinesthetic empathy.

* * * * *